US012735299B2

(12) United States Patent
Zhao

(10) Patent No.: US 12,735,299 B2
(45) Date of Patent: Sep. 15, 2026

(54) FIRE-RESISTANT SYNTHETIC TENSION MEMBERS

(71) Applicant: OTIS ELEVATOR COMPANY, Farmington, CT (US)

(72) Inventor: Chen Qian Zhao, Newark, DE (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 165 days.

(21) Appl. No.: 18/463,713

(22) Filed: Sep. 8, 2023

(65) Prior Publication Data

US 2023/0416049 A1 Dec. 28, 2023

Related U.S. Application Data

(62) Division of application No. 15/952,581, filed on Apr. 13, 2018, now abandoned.

(Continued)

(51) Int. Cl.

*B66B 7/06* (2006.01)
*B66B 23/24* (2006.01)

(Continued)

(52) U.S. Cl.

CPC .............. *B66B 7/062* (2013.01); *B66B 23/24* (2013.01); *D07B 1/16* (2013.01); *D07B 1/162* (2013.01); *D07B 1/025* (2013.01); *D07B 1/22* (2013.01); *D07B 2201/102* (2013.01); *D07B 2401/202* (2013.01); *D07B 2401/2035* (2013.01); *D07B 2501/2007* (2013.01); *D10B 2401/04* (2013.01); *D10B 2505/12* (2013.01)

(58) Field of Classification Search

CPC ........... B66B 7/062; B66B 23/24; D07B 1/16; D07B 1/162; D07B 1/025; D07B 1/22; D07B 2201/102; D07B 2401/202; D07B 2401/2035; D07B 2501/2007; D10B 2401/04; D10B 2505/12; F16G 1/16; F16G 9/04

USPC .......................................................... 428/379

See application file for complete search history.

(56) References Cited

U.S. PATENT DOCUMENTS

| | | | |
|---|---|---|---|
| 6,090,319 | A | 7/2000 | Sharma et al. |
| 2008/0166484 | A1 | 7/2008 | Smith |

(Continued)

FOREIGN PATENT DOCUMENTS

| | | |
|---|---|---|
| EP | 2749521 A2 | 7/2014 |
| JP | 2012158760 | 8/2012 |

(Continued)

OTHER PUBLICATIONS

Partial European Search Report for European Application No. 18168623.9, dated Jan. 8, 2019.

(Continued)

*Primary Examiner* — Matthew D Matzek

(74) *Attorney, Agent, or Firm* — Carlson, Gaskey & Olds, P.C.

(57) ABSTRACT

A load-bearing assembly according to an example of the present disclosure includes at least one tension member. The tension member has a resin, reinforcement fibers, and at least one additive that provides a fire-resistance to the tension member. A jacket material covers the at least one tension member. An alternate load-bearing assembly and a method of making a load-bearing assembly are also disclosed.

19 Claims, 5 Drawing Sheets

Related U.S. Application Data

(60) Provisional application No. 62/487,673, filed on Apr. 20, 2017.

(51) Int. Cl.
*D07B 1/16* (2006.01)
*D07B 1/02* (2006.01)
*D07B 1/22* (2006.01)

(56) References Cited

U.S. PATENT DOCUMENTS

| | | | | |
|---|---|---|---|---|
| 2008/0194736 | A1* | 8/2008 | Lu | C08J 3/20 524/451 |
| 2011/0100759 | A1* | 5/2011 | Yu | B66B 7/062 427/256 |
| 2011/0259677 | A1* | 10/2011 | Dudde | D07B 5/006 187/411 |
| 2011/0263773 | A1 | 10/2011 | Walker et al. | |
| 2011/0288210 | A1 | 11/2011 | Pinnavaia et al. | |
| 2012/0164373 | A1 | 6/2012 | Spencer et al. | |
| 2012/0329591 | A1 | 12/2012 | Goeser et al. | |
| 2014/0076669 | A1 | 3/2014 | Wesson et al. | |
| 2015/0336335 | A1 | 11/2015 | Okawa et al. | |
| 2016/0177062 | A1 | 6/2016 | Sato et al. | |

FOREIGN PATENT DOCUMENTS

| | | | |
|---|---|---|---|
| JP | 2014129181 | | 7/2014 |
| KR | 1020110045060 | | 5/2011 |
| KR | 1020130012257 | | 2/2013 |
| KR | 1020130095632 | | 8/2013 |
| KR | 101564194 | | 10/2015 |
| WO | 2010019151 | A1 | 2/2010 |
| WO | 2013055328 | | 4/2013 |
| WO | 2015134023 | | 9/2015 |
| WO | 2016030298 | | 3/2016 |
| WO | 2017012802 | | 1/2017 |

OTHER PUBLICATIONS

Examination Report for Australian Application No. 2018202595, dated Mar. 25, 2019.

European Polymer Journal. National Chung-Hsing, Department of Chemical Engineering. Flame retardant epoxy polymers based on all phosphorus-containing components. Jeng et al. Sep. 18, 2001.

European Conference on Composite Materials, ECCM. Budapest University of Technology and Economics. Comparison of additive and reactive phosphorus-based flame retardants in carbon fibre reinforced epoxy resin composites. Szolnoki, et al. 2012.

Science Direct. Flame retardant aircraft epoxy resins containing phosphorus. Hergenrother et al. Apr. 29, 2005. Retrieved from http://www.sciencedirect.com/science/article/pii/S0032386105004593.

* cited by examiner

FIRE-RESISTANT SYNTHETIC TENSION MEMBERS

CROSS-REFERENCE TO RELATED APPLICATIONS

This application is a divisional of U.S. patent application Ser. No. 15/952,581 filed Apr. 13, 2018; which claims priority to U.S. Provisional Application No. 62/487,673 filed on Apr. 20, 2017.

BACKGROUND

There are various uses for elongated flexible assemblies such as for elevator load bearing members or roping arrangements, drive belts for machines such as a passenger conveyor and handrails for passenger conveyors, for example. Such elongated flexible assemblies may comprise one or more tension members encased in a jacket material. Such assemblies may be designed with fire resistance performance in order to meet existing building codes. Such assemblies must also meet mechanical performance requirements, such as tensile strength and stiffness requirements.

SUMMARY

A load-bearing assembly according to an example of the present disclosure includes at least one tension member, the at least one tension member comprising a resin, reinforcement fibers, and at least one additive that provides a fire-resistance to the tension member. The load-bearing assembly also includes a jacket material covering the at least one tension member.

Another example load-bearing assembly according to an example of the present disclosure includes at least one tension member, the at least one tension member comprising a self-fire-resistant resin and reinforcement fibers, and a jacket material covering the at least one tension member.

An example method of making a load-bearing assembly includes providing reinforcement fibers to a die, providing a resin precursor to the die, curing the resin precursor and fibers to form at least one synthetic tension member comprising a resin having a fire-resistance, and covering the at least one synthetic tension member in a jacket material.

Various features and advantages of at least one disclosed example embodiment will become apparent to those skilled in the art from the following detailed description. The drawings that accompany the detailed description can be briefly described as follows.

DETAILED DESCRIPTION

Figure 1:
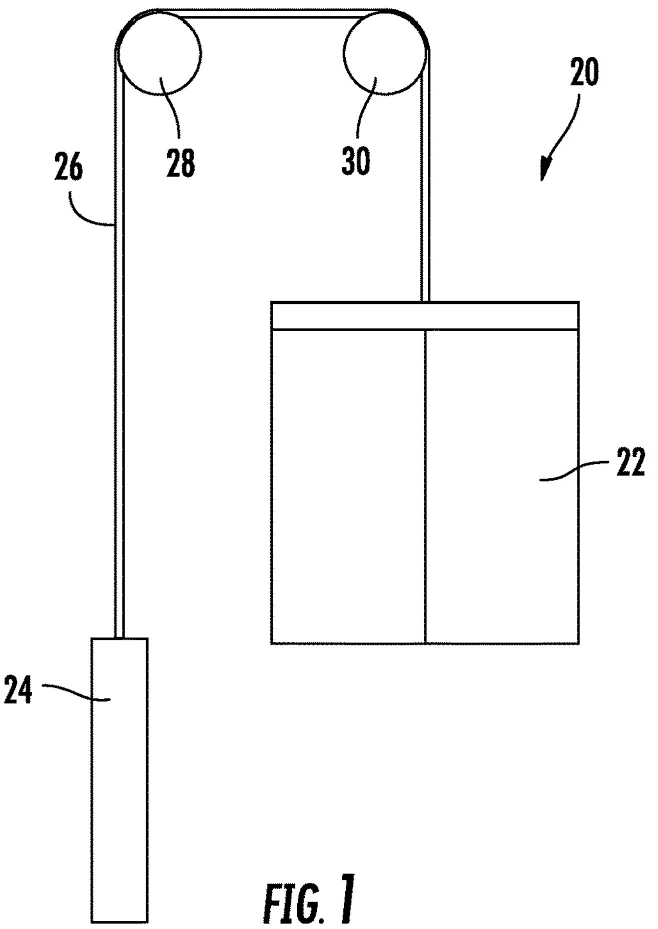
FIG. 1 schematically illustrates selected portions of an elevator system including a load bearing member designed according to an embodiment of this invention.

FIG. 1 schematically shows selected portions of an example elevator system 20. An elevator car 22 and counterweight 24 are suspended by a load bearing assembly 26. In one example, the load bearing assembly 26 comprises a plurality of flat belts. In another example, the load bearing assembly 26 comprises a plurality of round ropes.

The load bearing assembly 26 supports the weight of the elevator car 22 and the counterweight 24 and facilitates movement of the elevator car 22 into desired positions by moving along sheaves 28 and 30. One of the sheaves will be a traction sheave that is moved by an elevator machine in a known manner to cause the desired movement and placement of the elevator car 22. The other sheave in this example is an idler sheave.

Figure 2:
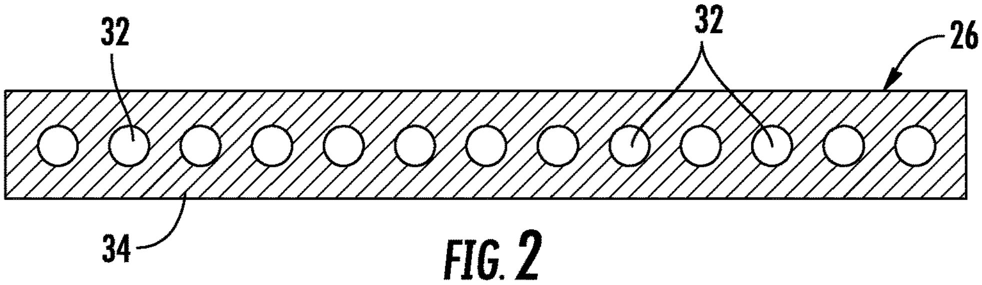
FIG. 2 is an end view schematically showing one example elevator load bearing member assembly.

FIG. 2 is an end view schematically showing one example flat belt configuration included as part of the example load bearing assembly 26. In this example, the flat belt includes a plurality of elongated cord tension members 32 and a polymer jacket 34 that contacts the tension members 32. In this example, the jacket 34 encases the tension members 32. The polymer jacket 34 in one example comprises a thermoplastic elastomer. In one example, the jacket 34 comprises a thermoplastic polyurethane.

Figure 3:
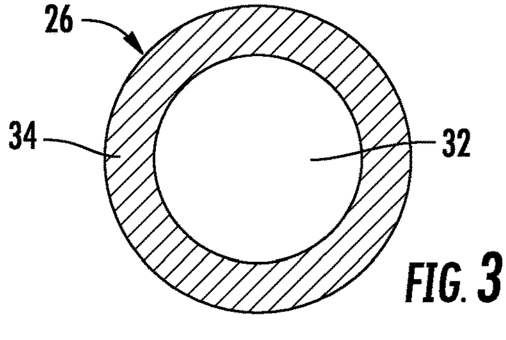
FIG. 3 is an end view schematically illustrating another example elevator load bearing assembly.

An example rope used as part of the load bearing assembly 26 is schematically shown in FIG. 3 and includes at least one tension member 32 and a polymer jacket 34. In the example of FIG. 3, the same materials can be used as those mentioned above.

Figure 4:
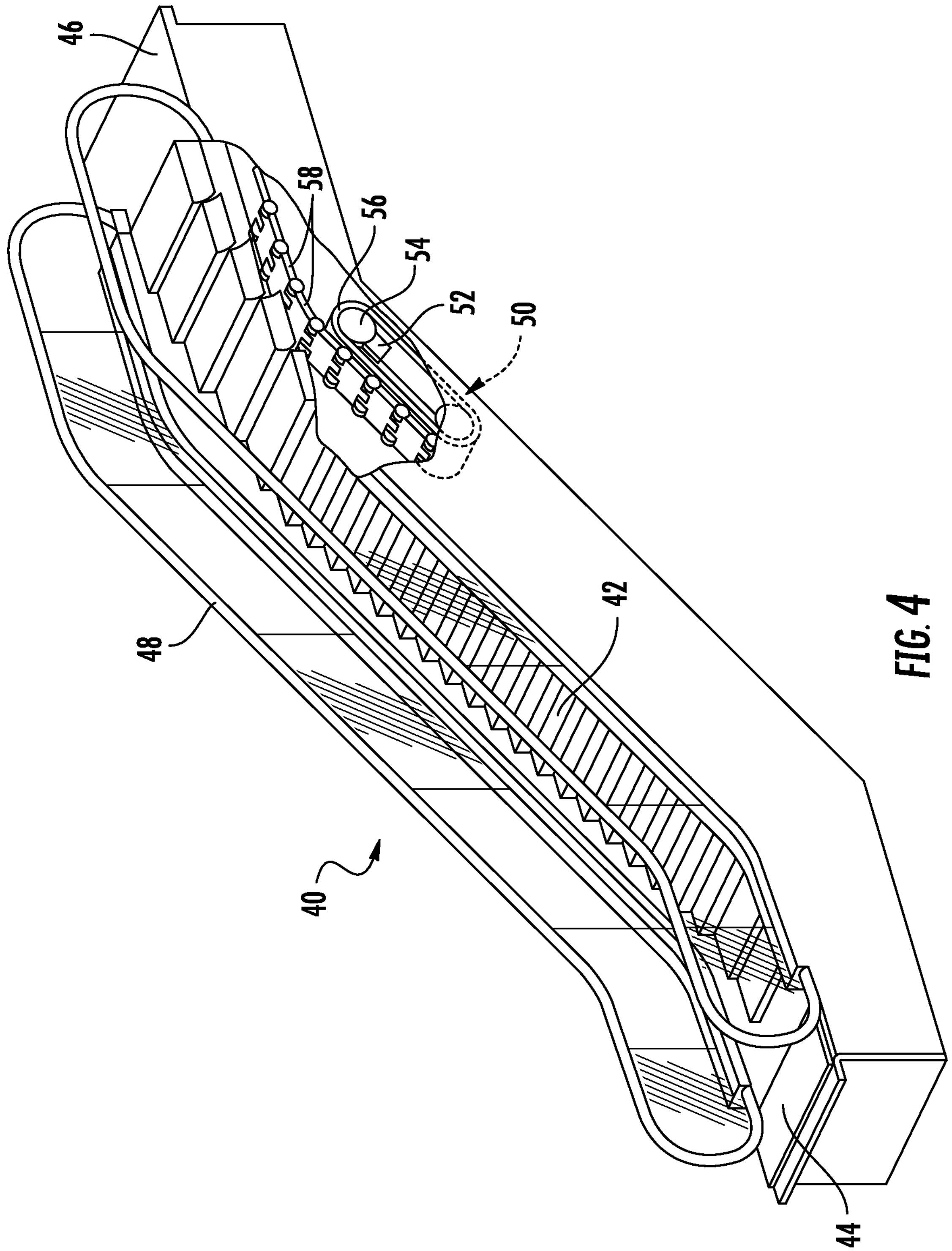
FIG. 4 diagrammatically illustrates a passenger conveyor including a drive belt and a handrail designed according to an embodiment of this invention.

FIG. 4 schematically illustrates an example passenger conveyor 40. In this example, a plurality of steps 42 move in a known manner to carry passengers between landings 44 and 46. A handrail 48 is provided for passengers to grab onto while traveling on the conveyor 40.

Figure 6:
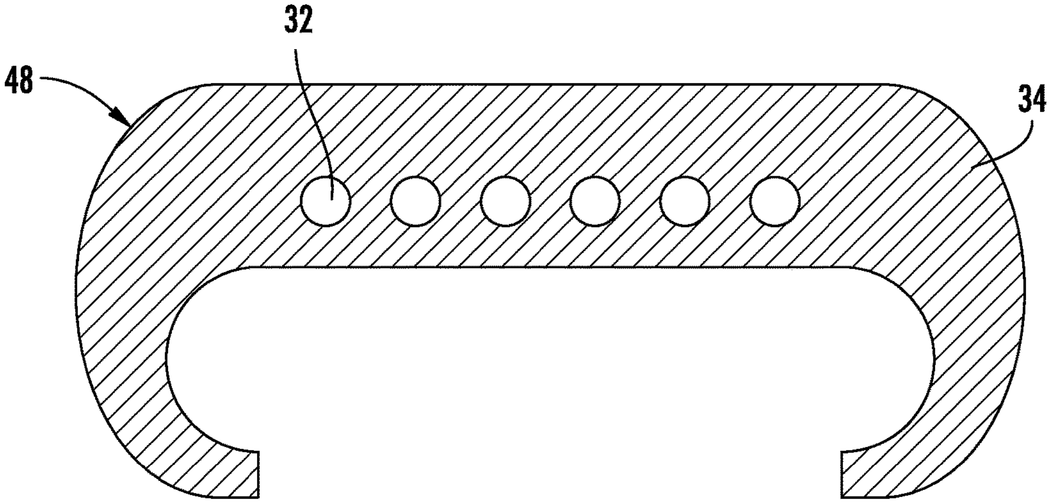
FIG. 6 schematically shows an example handrail configuration.

As shown in FIG. 6, the handrail 48 includes a plurality of tension members 32 at least partially covered by a polymer jacket 34. The polymer jacket in this example establishes the gripping surface and the body of the handrail 48.

Figure 5:
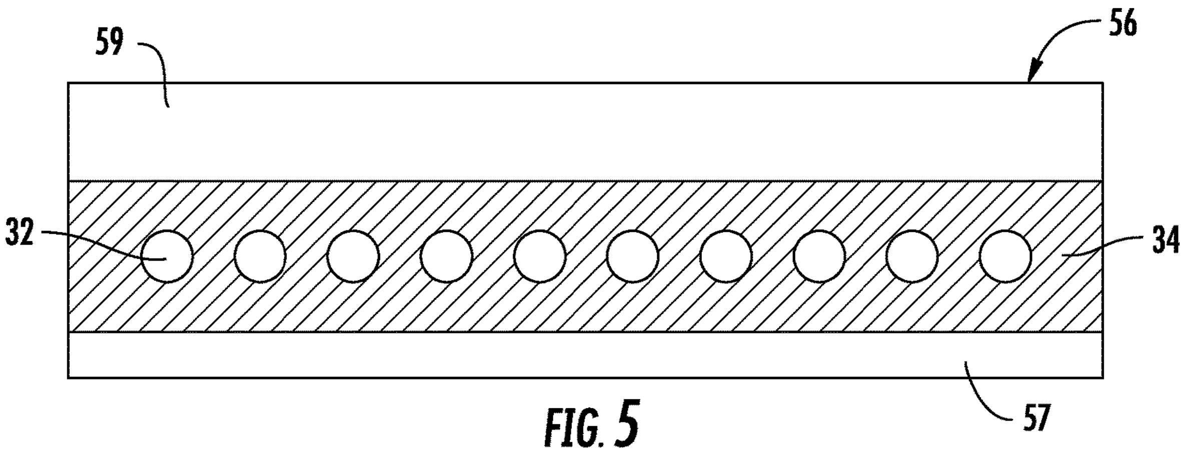
FIG. 5 schematically shows an example drive belt configuration.

The example of FIG. 4 also includes a drive arrangement 50 for propelling the steps 42 in a desired direction. A motor 52 rotates a drive sheave 54 to cause movement of a drive belt 56. As shown in FIG. 5, the example drive belt 56 has a plurality of elongated cord tension members 32 covered by a jacket 34. The jacket material establishes teeth 57 that interact with a corresponding surface on the drive sheave 54. A step chain 58 (FIG. 4) is engaged by teeth 59 on the drive belt 56 to cause the desired movement of the steps 42. In this example, the teeth 57 and 59 are on oppositely facing sides of the drive belt 56.

In some embodiments, the tension members 32 comprise synthetic material, or more particularly, a fiber-reinforced polymer resin. Synthetic tension members 32 are lighter than metal-based tension members, which can be advantageous in some situations. Synthetic materials do not typically have an inherent fire-resistant quality or characteristic.

Figure 7:
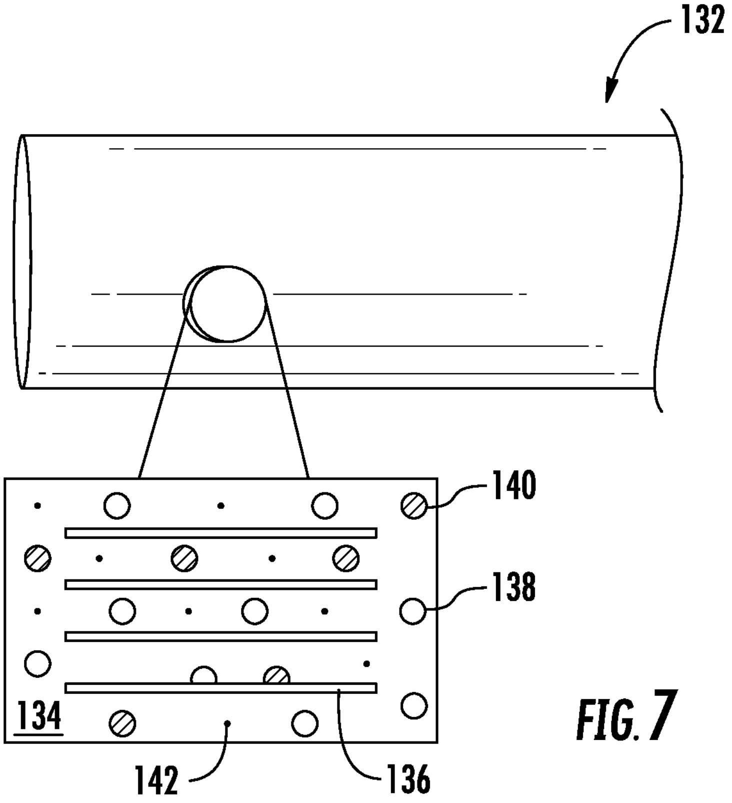
FIG. 7 schematically shows a detail view of an example synthetic tension member.

FIG. 7 schematically illustrates selected features of a first example synthetic tension member 132. The synthetic tension member 132 includes a resin 134. Example resins 134 include epoxy, polyurethane, vinyl ester, ethylene propylene diene monomer (EPDM), and melamine.

Tension member 132 includes fibers 136 that enhance the mechanical properties of the synthetic tension member 132. The fibers 136 are encased in the resin 134 in this example. Though the fibers 136 in FIG. 7 are shown arranged parallel to one another, any fiber arrangement can be used, including random fiber arrangement. Example fibers 136 include liquid crystal polymer, carbon fiber, glass fiber, ultra high molecular weight polyethylene and/or polypropylene fiber, polybenzoxazole fiber, aramid fiber and nylon.

The resin 134 also includes one or more additives. In a particular example, the synthetic tension member 132 includes a first additive 138 that provides fire-resistant properties and a second additive 140 that provides smoke-suppressant/char-forming properties. Example fire-resistant first additives 138 include phosphorous-containing or nitrogen-containing compounds or polymers. Example smoke-suppressant and/or char-forming second additives 140 include metal-exchanged clays, zeolites, zinc molybdate, zinc borate complex, zinc molybdenate, magnesium silicate complex.

In the illustrated example, the synthetic tension member 132 includes an optional nanofiller 142. The optional nanofiller 142 allows for improved mechanical properties and customization of the synthetic tension member 132. Example nanofillers 142 include materials with one or more of the following functional groups: glycidyl, silane, hydroxyl, carboxyl, amine, isocyanate, ethylene, and amide. More particularly, example nanofillers include magnesium hydroxide and aluminum trihydrate. In some examples, the nanofiller 142 is chemically treated.

Figure 8:
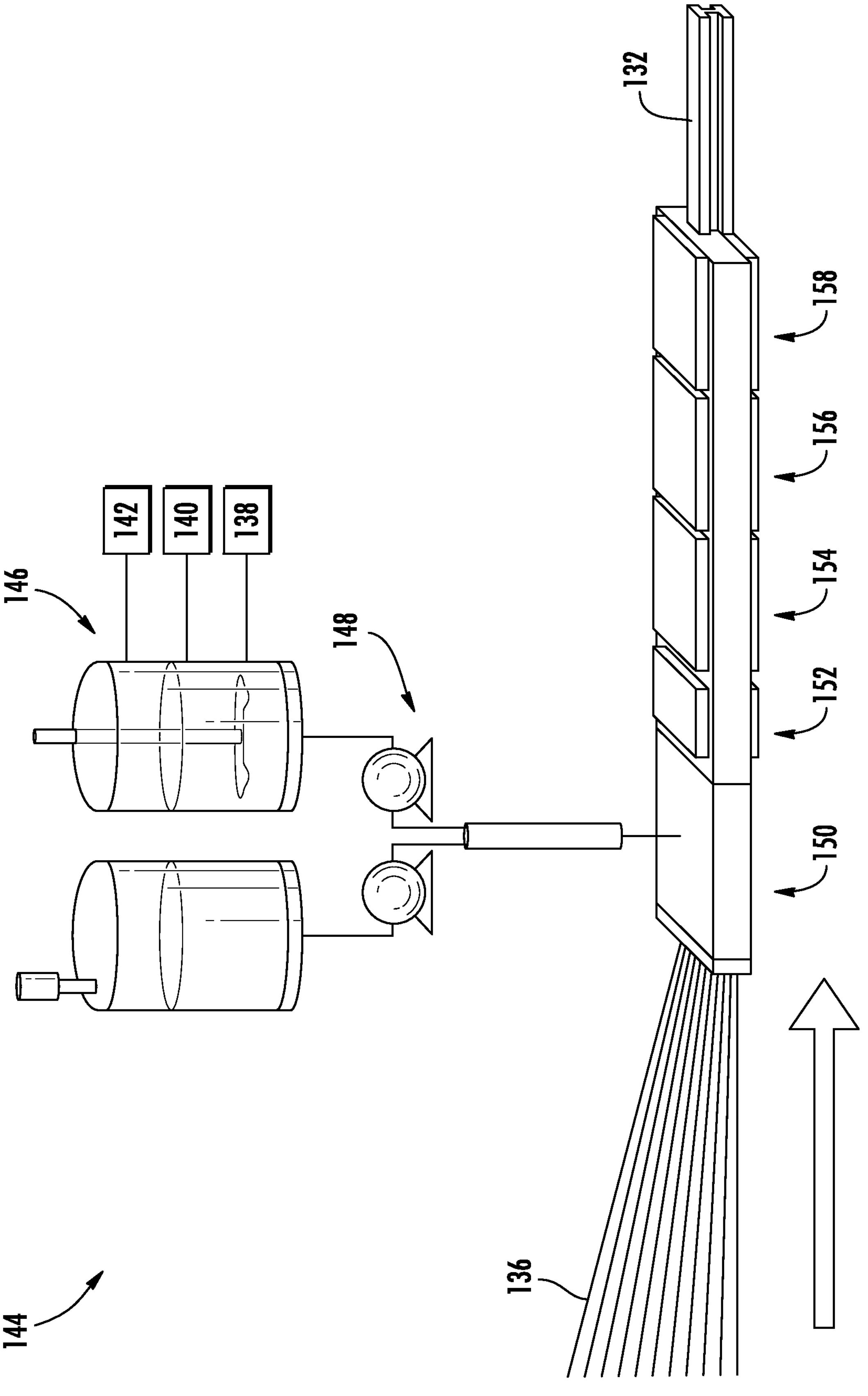
FIG. 8 schematically shows a system for making a synthetic tension member.

FIG. 8 shows a system 144 for making the example tension member 132. The system 144 includes at least one resin-precursor tank 146 and at least one metering pump 148. This example includes two tanks 146 and a dedicated metering pump 148 for each of the at least one resin-precursor tanks 146. Additives 138, 140 and option nanofiller 142 are added to the at least one resin-precursor tank 146. In one example, multiple resin-precursor tanks 146 contain different types of resin precursors (for instance, selected precursors to the example resin 134 discussed above), which are blended together. The at least one resin-precursor tank 146 provides resin precursor with additives to an injection box 150. The injection box 150 also receives fibers 136.

The injection box 150 provides the resin 134 and fibers 136 to a die 152. In one example, the die 152 is at a different temperature than the injection box 150. More particularly, the die 152 is cooled. The die 152 forms the resin 134 and fibers 136 into the shape of a tension member 132. The shaped tension member 132 travels through one or more zones 154, 156, and 158 which are at various temperatures selected to cure the resin 134.

Figure 9:
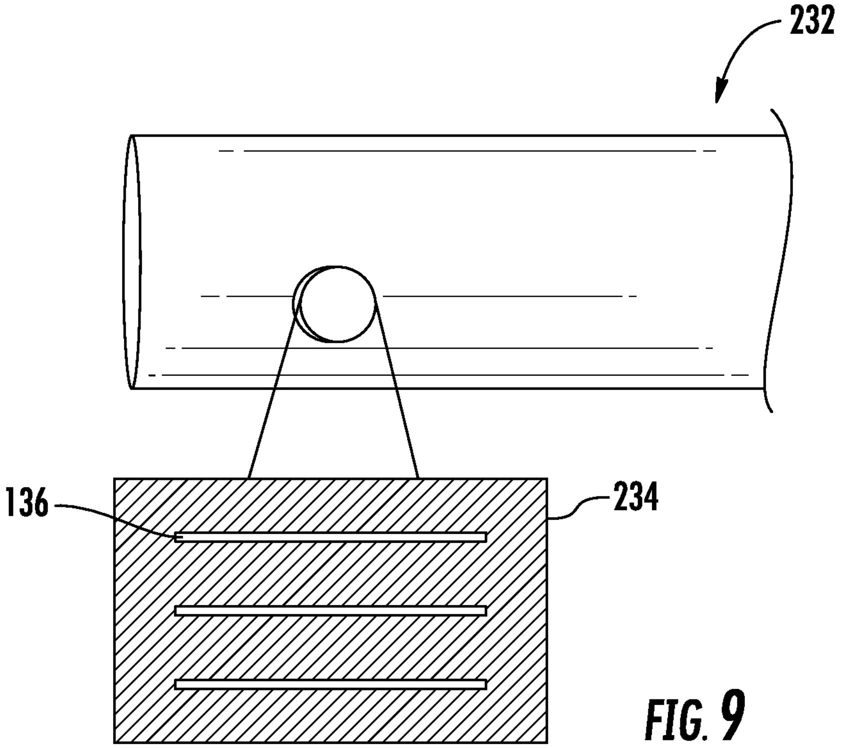
FIG. 9 schematically shows a detail view of another example synthetic tension member.

FIG. 9 schematically illustrates features of a second example synthetic tension member 232. The synthetic tension member 232 comprises a self-fire-resistant resin 234 and reinforcement fibers 136. The self-fire-resistant resin 234 comprises a resin precursor that is chemically cured with a fire-resistant curing agent. The curing causes fire-resistant functional groups to be incorporated into the resin precursor, forming self-fire-resistant resin 234. In one example, the curing introduces fire-resistant functional groups into cross-links of the self-fire-resistant resin 234.

An example self-fire-resistant resin 234 is a rigid thermoset carbon-epoxy composite. Example epoxy resin precursors include diglycidylmethylphosphonate, diglycidylphenylphosphonate, triglycidylphosphite, and triglycidylphosphate. Example curing agents include aliphatic polyether triamine (such as JD-FAMINE® T-403, available from Huntsman Corporation), bis(4-aminophenyl) phenylphosphine oxide, bis(3-aminophenyl)methylphosphine oxide and bis(4-aminophenyl)methylphosphonate.

The tension member 232 comprising the self-fire-resistant resin 234 is, in one example, formed by a system similar to the system 144 of FIG. 8, except that no additives are added to the resin precursor because the resin precursor already has fire-resistant properties.

Though the fibers 136 in FIG. 8 are shown arranged parallel to one another, any fiber arrangement can be used, including random fiber arrangement. Example fibers 136 include liquid crystal polymer, carbon fiber, glass fiber, ultra high molecular weight polyethylene and/or polypropylene fiber, polybenzoxazole fiber, aramid fiber and nylon.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A load-bearing assembly, comprising:
- at least one elliptical tension member, the at least one elliptical tension member comprising:
- a resin;
- reinforcement fibers encased in the resin;
- at least one additive that provides a fire-resistance to the at least one elliptical tension member, wherein the at least one additive comprises
  - at least one of a phosphorous-containing and a nitrogen-containing first additive that provides fire-resistance properties to the at least one elliptical tension member, and
  - at least one of metal-exchanged clays, zeolites, zinc molybdate, zinc borate complex, zinc molybdenate, and magnesium silicate complex as a second additive that provides smoke-suppressant properties to the at least one elliptical tension member, and wherein the first additive is separate from the second additive;
- a nanofiller that is separate from the reinforcement fibers, the first additive and the second additive, the nanofiller including magnesium hydroxide and aluminum trihydrate, and the nanofiller having at least one of the following functional groups: glycidyl, silane, hydroxyl, carboxyl, amine, isocyanate, ethylene, and amide; and
- a jacket material that is separate from the resin and encases the at least one elliptical tension member.

2. The load-bearing assembly of claim 1, wherein the load-bearing assembly is configured to support the weight of an elevator car.

3. The load-bearing assembly of claim 1, wherein the load-bearing assembly is a handrail for a passenger conveyor, and wherein the at least one elliptical tension member comprises a plurality of elliptical tension members that are encased within the jacket material to form a polymer jacket that establishes an external gripping surface and body of the handrail.

4. The load-bearing assembly of claim 1, wherein the resin comprises at least one of epoxy, polyurethane, vinyl ester, ethylene propylene diene monomer (EPDM), and melamine.

5. The load-bearing assembly of claim 4, wherein the reinforcement fibers comprise at least one of liquid crystal polymer, carbon fiber, glass fiber, ultra high molecular weight polyethylene fiber, ultra high molecular weight polypropylene fiber, fiber, polybenzoxazole fiber, aramid fiber and nylon.

6. A load-bearing assembly, comprising:

at least one tension member having a circular cross-section and comprising:

a self-fire resistant resin including at least one of epoxy, polyurethane, vinyl ester, ethylene propylene diene monomer (EPDM), and melamine, the self-fire resistant resin comprising at least a first additive of at least one nitrogen-based or phosphorous-based functional group that provides fire-resistant properties;

reinforcement fibers encased in the self-fire resistant resin;

a nanofiller separate from the reinforcement fibers and including magnesium hydroxide and aluminum trihydrate; and a jacket material separate from the self-fire resistant resin and encasing the at least one tension member.

7. The load-bearing assembly of claim 1, wherein the reinforcement fibers are arranged parallel to one another.

8. The load-bearing assembly of claim 1, wherein the reinforcement fibers are arranged in a random fiber arrangement.

9. The load-bearing assembly of claim 1, wherein:

the resin comprises at least one of epoxy, polyurethane, vinyl ester, ethylene propylene diene monomer (EPDM), and melamine;

the jacket material comprises a thermoplastic elastomer; and the reinforcement fibers comprise at least one of liquid crystal polymer, carbon fiber, glass fiber, ultra high molecular weight polyethylene fiber, ultra high molecular weight polypropylene fiber, fiber, polybenzoxazole fiber, aramid fiber and nylon.

10. The load-bearing assembly of claim 9, wherein the reinforcement fibers are arranged parallel to one another.

11. The load-bearing assembly of claim 9, wherein the reinforcement fibers are arranged in a random fiber arrangement.

12. The load-bearing assembly of claim 6, wherein the load-bearing assembly is configured to support the weight of an elevator car, and wherein:

the jacket material comprises a thermoplastic elastomer; and the reinforcement fibers comprise at least one of liquid crystal polymer, carbon fiber, glass fiber, ultra high molecular weight polyethylene fiber, ultra high molecular weight polypropylene fiber, fiber, polybenzoxazole fiber, aramid fiber and nylon.

13. The load-bearing assembly of claim 6, wherein the load-bearing assembly is a handrail for a passenger conveyor, and wherein the at least one tension member comprises a plurality of tension members that are encased within the jacket material to form a polymer jacket that establishes an external gripping surface and body of the handrail.

14. The load-bearing assembly of claim 6, wherein the at least one tension member comprises a plurality of tension members that are aligned in a single row, and wherein each tension member has a circular cross-section.

15. The load-bearing assembly of claim 14, wherein the jacket material encases the plurality of tension members to form a drive belt for a passenger conveyor, and wherein the jacket material establishes a first set of teeth that interact with a corresponding surface on a drive sheave that is driven by a motor, and wherein a step chain is engaged by a second set of teeth on the drive belt to propel steps in a desired direction.

16. The load-bearing assembly of claim 1, wherein the at least one elliptical tension member comprises a plurality of elliptical tension members that are aligned in a single row.

17. The load-bearing assembly of claim 16, wherein the jacket material encases the plurality of elliptical tension members to form a drive belt for a passenger conveyor, and wherein the jacket material establishes a first set of teeth that interact with a corresponding surface on a drive sheave that is driven by a motor, and wherein a step chain is engaged by a second set of teeth on the drive belt to propel steps in a desired direction.

18. The load-bearing assembly of claim 16, wherein each elliptical tension member has a circular cross-section.

19. The load-bearing assembly of claim 16, wherein each elliptical tension member comprises a cord or rope.

* * * * *